United States Patent
Atkins et al.

(10) Patent No.: US 12,378,384 B2
(45) Date of Patent: Aug. 5, 2025

(54) POLYMER RECYCLING

(71) Applicant: Poseidon Plastics Limited, Redcar (GB)

(72) Inventors: Martin Atkins, Redcar (GB); Nicholas Curry, Redcar (GB)

(73) Assignee: Poseidon Plastics Limited, Redcar (GB)

( * ) Notice: Subject to any disclaimer, the term of this patent is extended or adjusted under 35 U.S.C. 154(b) by 604 days.

(21) Appl. No.: 17/634,340

(22) PCT Filed: Aug. 13, 2020

(86) PCT No.: PCT/GB2020/051942
§ 371 (c)(1),
(2) Date: Feb. 10, 2022

(87) PCT Pub. No.: WO2021/028695
PCT Pub. Date: Feb. 18, 2021

(65) Prior Publication Data
US 2022/0325064 A1    Oct. 13, 2022

(30) Foreign Application Priority Data
Aug. 13, 2019    (GB) .................................... 1911587

(51) Int. Cl.
*C08J 11/24*    (2006.01)
(52) U.S. Cl.
CPC ............ *C08J 11/24* (2013.01); *C08J 2367/02* (2013.01)
(58) Field of Classification Search
USPC ........................................................ 521/48.5
See application file for complete search history.

(56) References Cited

U.S. PATENT DOCUMENTS

2004/0182782 A1    9/2004    Inada et al.

FOREIGN PATENT DOCUMENTS

| CN | 100351222 C | 11/2007 | |
|---|---|---|---|
| CN | 206502610 U | 9/2017 | |
| CN | 206502640 U | 9/2017 | |
| CN | 107406618 A | 11/2017 | |
| CN | 107459629 A | 12/2017 | |
| EP | 723951 A1 * | 7/1996 | ............. C07C 67/03 |
| EP | 2281804 A1 | 2/2011 | |
| FR | 3030541 A1 | 6/2016 | |
| JP | S4541215 B1 | 12/1970 | |
| JP | 2000169623 A | 6/2000 | |
| JP | 2002332379 A * | 11/2002 | ............. C08J 11/12 |
| JP | 2006232701 A | 9/2006 | |
| JP | 2008088096 A | 4/2008 | |
| WO | 2006039872 A1 | 4/2006 | |
| WO | 2016096768 A1 | 6/2016 | |
| WO | 2016105200 A1 | 6/2016 | |
| WO | 2017087752 A1 | 5/2017 | |
| WO | 2019001137 A1 | 1/2019 | |

OTHER PUBLICATIONS

JP-2002332379-A Machine Translation (Year: 2002).*
Database WPI; Week 197101; Thomson Scientific; London. GB; an 1971-00753S; XP002800545, & JP S45 41215 B (Teijin Ltd) abstract.
Database WPI; Week 197101; Thomson Scientific. London. GB; an 1971-00753S; XP002800546; & JP S45 41215 B (Teijin Ltd) abstract.
GB Search Report dated Jan. 31, 2020 for GB1911587.2.
International Search Report dated Dec. 3, 2020 for PCT/GB2020/051942.
Combined Search and Examination Report for GB2008641.9, dated Aug. 11, 2020.
Liu, Bo et al., "Lewis Acid-Base Synergistic Catalysis for Polyethylene Terephthalate Degradation by 1,3-Dimethylurea/Zn(OAc)2 Deep Eutectic Solvent", ACS Sustainable Chemistry & Engineering 2019 7 (3), pp. 3292-3300 DOI: 10.1021/acssuschemeng.8b05324.
Notification of the First Office Action in China for Application No. 202080071398.1, dated Sep. 18, 2024.
Office Action in Brazil for Application No. BR112022002542-4, dated Aug. 13, 2020.
Office Action in Korea for Application No. 10-2022-7008273, dated Dec. 4, 2024.

* cited by examiner

*Primary Examiner* — Terressa Boykin
(74) *Attorney, Agent, or Firm* — Ryan T. Grace; Advent, LLP

(57) ABSTRACT

A method for recycling polyethylene terephthalate (PET) to produce bis(2-hydroxyethyl) terephthalate (BHET) comprises the steps of (a) depolymerising PET in the presence of ethylene glycol and a catalyst system in a series of preferably two depolymerisation reactors to form a depolymerised mixture comprising BHET; (b) crystallising a precipitate comprising BHET from the depolymerised mixture; (c) dissolving the precipitate in a protic solvent, preferably water, but also optionally methanol, to form a solution comprising BHET; (d) removing impurities from the solution to form a purified solution comprising BHET; and (e) crystallising a purified product comprising BHET from the purified solution. Suitable apparatus for such a method, and the use of urea in a catalyst system therefor, are also provided.

20 Claims, 4 Drawing Sheets

POLYMER RECYCLING

FIELD OF THE INVENTION

The present invention relates to a method and apparatus for recycling polymers, in particular to a method for recycling polyethylene terephthalate (PET) to produce bis(2-hydroxyethyl) terephthalate (BHET). The BHET produced using the method and apparatus of the present invention may be of a purity level which renders it suitable for direct use in the preparation of high quality plastics.

BACKGROUND TO THE INVENTION

PET is a thermoplastic polymer that is used in a wide range of materials due to its properties of, among others, strength, mouldability and moisture impermeability. Common uses of PET include in packaging (e.g. in drinks bottles and food containers), in fibres (e.g. in clothing and carpets) and in thin films.

Virgin PET may be readily prepared using ethylene glycol and a terephthalate-containing monomer. Nevertheless, since its raw materials are obtained from non-renewable sources such as crude oil, there is an increasing awareness of the need to recycling PET.

When PET waste is made up of just a single type of PET, such as clear plastic water bottles, recycling may be as simple as melting and remoulding flakes of the waste material. It is, however, usual for waste to comprise a variety of different PET materials, such as a range of different coloured bottles which, if melted and remoulded, would give a product with a low visual grade. Such materials may be suitable for use in carpet fibres, but they are generally not suitable for use in packaging such as in clear water bottles.

Accordingly, there is a need for methods for recycling waste PET into a product which can be used in applications which require a high visual grade.

More sophisticated methods for recycling PET involve depolymerising the waste material to obtain, usually after a number of purification and separation steps, viable raw materials for use in the preparation of a polymer.

For instance, PET may be depolymerised using a glycolysis agent such as ethylene glycol to form BHET monomers. However, conventional methods for depolymerising PET tend to produce BHET monomers at a yield of less than 80%, with significant amounts of oligomers of BHET, in particular dimers and trimers, produced from the remainder of the PET.

Since the presence of dimers and trimers reduces the quality of a polymer that is prepared from the BHET raw material, it is conventional to purify a depolymerisation mixture in order to remove these components. Further purification is particularly important where high quality recycled PET is required, for instance recycled PET that is suitable for use in transparent and colour-free bottles.

Colour spaces are often used to denote the grade of a polymer, with the b[h] value—a measure of blue (negative values) to yellow (positive values) tone—taken as a key indicator of quality. Poor quality recycled PET typically exhibits an unwanted yellow hue.

There are a number of drawbacks associated with processes in which a depolymerisation mixture is produced which contains significant quantities of dimer and trimer. One of the most significant is that considerable amounts of the PET raw material are lost from the recycling process when it is removed in the form of dimers and trimers. Unless the dimers and trimers are recycled for further depolymerisation, which in itself requires time and energy, the efficiency of typical PET recycling processes is therefore quite low.

Accordingly, there is a need for improved methods for the depolymerisation recycling of waste PET. In particular, there is a need for methods for the depolymerisation recycling of waste PET which provide products suitable for use in high quality applications, such as in clear water bottles.

SUMMARY OF THE INVENTION

It has surprisingly been found that, by using a series of depolymerisation reactors, a depolymerised mixture may be obtained which contains a very high proportion of BHET monomer and relative low amounts of dimer and trimer, thereby enabling conventional purification steps in which dimers and trimers are removed to be omitted. This means that solvents that would have previously been rejected as unsuitable for further processing of the crude BHET monomer may be used.

The present inventors have found that protic solvents are highly effective for recrystallising the crude depolymerisation product. In particular, water is preferred for this use, as dimers and trimers of BHET are insoluble in water. Thus, the BHET dissolves to form an aqueous phase, while the dimers and trimers remain as solid materials which can be separated from the aqueous phase, e.g. by filtration, before recrystallisation, resulting in a high purity monomer product.

Methanol may also preferably be used since it at least partially decolours the product with minimal product loss. Though methanol dissolves and carries the dimers and trimers through the process so that they may be present in purified product comprising BHET, their concentration may be low enough that the purified product can nonetheless be used directly in a polymerisation reaction. The resulting polymer may be used in high quality applications, such as in transparent and colour-free water bottles.

Furthermore, as detailed hereinbelow, it is also possible to use aprotic, and even non-polar solvents for recrystallising the crude depolymerisation product, while retaining the advantages of the use of serial depolymerisation reactors in accordance with the present disclosure.

Accordingly, the present invention provides a method for recycling polyethylene terephthalate (PET), said method comprising:
(a) depolymerising PET in the presence of ethylene glycol and a catalyst system in a series of depolymerisation reactors to form a depolymerised mixture comprising bis(2-hydroxyethyl) terephthalate (BHET);
(b) crystallising a precipitate comprising BHET from the depolymerised mixture;
(c) dissolving the precipitate in a protic solvent to form a solution comprising BHET;
(d) removing impurities from the solution to form a purified solution comprising BHET; and
(e) crystallising a purified product comprising BHET from the purified solution.

The present invention further provides a purified product comprising BHET which is obtainable using a method of the present invention.

A method for preparing a polymer is also provided, said method comprising carrying out a polymerisation reaction using a purified product comprising BHET of the present invention.

Further provided is an apparatus for recycling PET, said apparatus comprising:

(a) a series of depolymerisation reactors which are suitable for depolymerising PET to form a depolymerised mixture comprising BHET, wherein the series of depolymerisation reactors is adapted to receive PET, ethylene glycol and a catalyst system;
(b) a crystallisation unit downstream of the polymerisation reactors suitable for crystallising a precipitate comprising BHET from the depolymerised mixture;
(c) a vessel for receiving the precipitate and which is suitable for dissolving the precipitate in a protic solvent to form a solution comprising BHET;
(d) an impurity removal unit for receiving the solution comprising BHET and which removes impurities from the solution to form a purified solution; and
(e) a further crystallisation unit downstream of the purity removal unit suitable for crystallising a purified product comprising BHET from the purified solution.

The present invention also provides the use of a urea in a catalyst system in a polyethylene terephthalate (PET) recycling process for: solubilising metals, in particular a transition metal catalyst component of the catalyst system; and/or forming a eutectic salt with a transition metal catalyst component of the catalyst system.

DETAILED DESCRIPTION OF THE INVENTION

Figure 1:
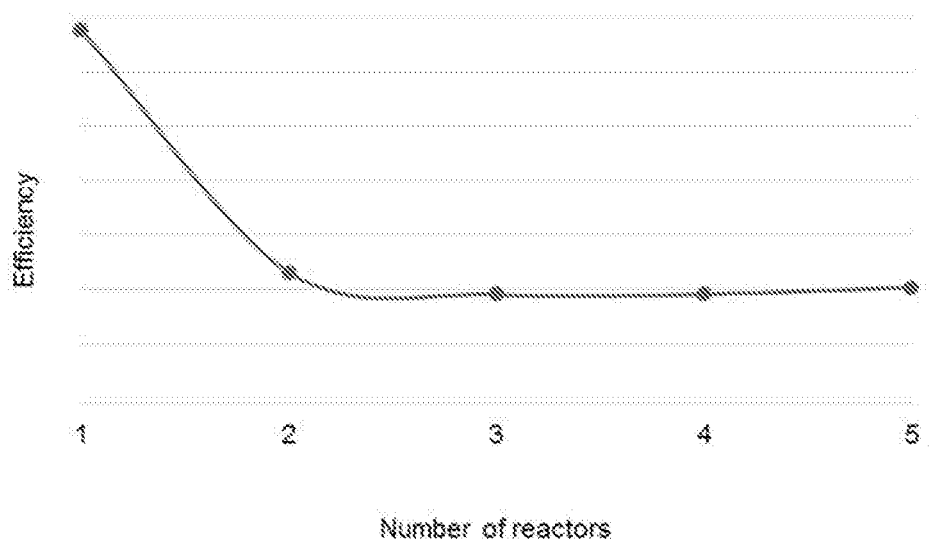
FIG. 1 is a graph showing the efficiency of depolymerisation reactions carried out using different series of reactors.

The present invention provides a method for recycling polyethylene terephthalate (PET).

PET is a thermoplastic polymer having the following structure:

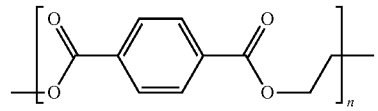

The PET that is used in the method of the present invention will typically be waste PET. The waste PET may be obtained from a wide range of sources, including packaging, bottles and textiles. Preferably the PET is obtained from waste bottles. The PET that is used in step (a) may be washed PET, i.e. PET that has been through a cleaning process. The washed PET may be PET that has been washed with water, purified by steaming, solvent cleaned and/or detergent cleaned. Preferably, the PET that is used in step (a) is PET that has been washed with water.

The PET that is used in step (a) preferably contains coloured PET. The PET may contain coloured PET in an amount of at least 5%, preferably at least 10%, and more preferably at least 25% by weight. In some embodiments, the PET may contain coloured PET in an amount of at least 50%, and more preferably at least 75% by weight. The PET may contain coloured PET in an amount of up to 100% by weight.

The PET that is used in step (a) preferably exhibits a b[h] value (i.e. a b-value on the Hunter Lab colour space) of greater than 5, for instance greater than 10, though some PET feeds may have a b[h] value of 100 or even higher. This may be measured using standard techniques, such as with a colour meter.

The PET is preferably used in step (a) the form of particles, such as flakes. Preferably, at least 80% by weight of the particles (i.e. d80) pass through a mesh having openings with a diameter of 20 mm, preferably 15 mm, and more preferably 12 mm. Even lower mesh sizes may also be used. Particles having these sizes are rapidly depolymerised.

Although a range of particle sizes will typically be used in step (a), larger particle sizes are preferably avoided since they may take longer to process. Accordingly, 100% by weight of the particles (d100) preferably pass through a mesh having openings with a diameter of 25 mm, preferably 20 mm, and more preferably 12 mm. Even lower mesh sizes may also be used. Overly small particles are also preferably avoided, unless the powders are already available through waste collection and separation processes, since the energy and therefore cost required to comminute the PET to this size is unnecessary. Thus, it is preferred that a maximum of 1% by weight of the particles pass through a mesh having openings with a diameter of 0.1 mm, preferably 0.5 mm, and more preferably 1 mm.

It will be appreciated that the PET that used in step (a) may be passed to the series of reactors in a form in which it is coated with a liquid, e.g. residual water or other solvent that has been used to clean the PET. This liquid coating is not considered to form part of the PET for the purposes of the present invention.

In step (a) of the method, PET is depolymerised in a series of depolymerisation reactors to form a depolymerised mixture comprising bis(2-hydroxyethyl) terephthalate (BHET). BHET is a monomer having the following structure:

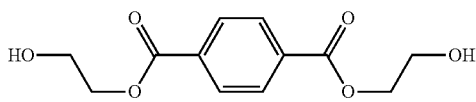

The PET is partially depolymerised in a first depolymerisation reactor, and further depolymerised downstream of the first reactor in the series of reactors. By using a series of reactors, it has been found that the depolymerised mixture may comprise a high proportion of BHET, and a low level dimers and trimers. Dimers and trimers have the following structure:

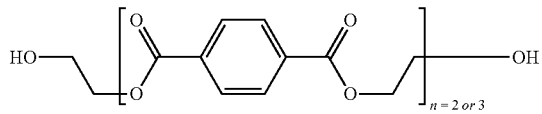

Higher oligomers will generally not be present in the depolymerised mixture. Thus, in preferred embodiments, the depolymerised mixture is substantially free from higher oligomers (i.e. where $n \geq 4$).

Surprisingly, a very high quality product may be produced by depolymerising the PET in a series of just two reactors. Thus, in preferred embodiments, the PET is depolymerised in a series of two depolymerisations reactors. This gives high levels of both conversion of the PET and selectivity for BHET. In alternative embodiments, the PET is depolymerised in a series of three, or alternatively four or more, reactors.

Preferably, all of the ethylene glycol and catalyst system used in the depolymerisation process are added to the first reactor of the series. However, in some embodiments, further ethylene glycol and/or catalyst system may be added to the reaction mixture downstream of the first reactor as it is passed through the series of depolymerisation reactors.

It will be appreciated that, though ethylene glycol and/or catalyst system may be added to the reaction mixture downstream of the first reactor, no components are removed from the reaction as it passes through the series of reactors.

Each of the depolymerisation reactors used in step (a) may be operated at a temperature of at least 150° C., preferably at least 170° C., and more preferably at least 190° C. Each of the depolymerisation reactors used in step (a) may be operated at a temperature of up to 230° C., preferably up to 220° C., and more preferably up to 210° C. Thus, each of the depolymerisation reactors used in step (a) may be operated at a temperature of from 150 to 230° C., preferably from 170 to 220° C., and more preferably from 190 to 210° C.

Generally, the depolymerisation reactors will be operated at the same temperature but this is not necessarily the case.

Unlike many prior art process, the PET is preferably not used in a molten state in step (a), meaning that the reaction mixture is relatively viscous. This viscosity has typically led to relatively low levels of PET conversion. It is surprising that, by using a series of depolymerisation reactors, excellent levels of conversion can be obtained even where step (a) is carried out with PET in a solid state.

Each of the depolymerisation reactors used in step (a) may be operated at atmospheric pressure, i.e. without the application or removal of pressure. Standard atmospheric pressure is defined as 101,325 Pa. However, since atmospheric pressure varies from location to location, atmospheric pressure as used herein is considered to be approximately equal to standard atmospheric pressure, i.e. approximately 101,325 Pa.

Each of the depolymerisation reactors used in step (a) may be operated for a period of at least 20 minutes, preferably at least 1 hour, and more preferably at least 1.5 hours. Each of the depolymerisation reactors used in step (a) may be operated for a period of up to 4 hours, preferably up to 2.5 hours, and more preferably up to 1.75 hours. Thus, each of the depolymerisation reactors used in step (a) may be operated from 20 minutes to 4 hours, preferably from 1 to 3 hours, and more preferably from 1.5 to 2.5 hours. The depolymerisation reactors may all be operated for the same period, but this is not necessarily the case.

PET may be passed to the series of depolymerisation reactors at a flow rate of at least 100 kg, preferably at least 500 kg, and more preferably at least 1,000 kg, per hour. PET may be passed to the series of depolymerisation reactors at a flow rate of up to 100,000 kg, preferably up to 50,000 kg, and more preferably up to 10,000 kg, per hour. Thus, PET may be passed to the series of depolymerisation reactors at a flow rate of from 100 to 100,000 kg, preferably from 500 to 50,000 kg, and more preferably from 1,000 to 10,000 kg, per hour.

Each of the depolymerisation reactors used in step (a) is preferably operated with stirring.

The size of the reactors used in the series of depolymerisation reactors may vary depending on how many reactors are used. Each of the reactors used in step (a) may have a size of at least 5 m$^3$, preferably at least 8 m$^3$, and more preferably at least 10 m$^3$. Each of the reactors used in step (a) may have a size of up to 50 m$^3$, preferably up to 20 m$^3$, and more preferably up to 15 m$^3$. Thus, each of the reactors used in step (a) may have a size of from 5 to 50 m$^3$, preferably from 8 to 20 m$^3$, and more preferably from 10 to 15 m$^3$. The use of reactors on this small scale is made possible by having a series of reactors through which PET may be depolymerised with minimal residence time. Thus, industrial scale amounts of PET may be depolymerised into a high quality product using relatively small reactors.

Ethylene glycol is used in step (a) as a glycolysis agent. Ethylene glycol may be used in step (a) in amount of at least 2 times, preferably at least 3.25 times, and more preferably at least 3.5 times the amount of PET by weight. Ethylene glycol may be used in step (a) in amount of up to 6 times, preferably up to 5 times, and more preferably up to 4.75 times the amount of PET by weight. Thus, ethylene glycol may be used in step (a) in amount of from 2 to 6 times, preferably from 3.25 to 4.75 times, and more preferably from 3.5 to 4.75 times the amount of PET by weight.

At least 60%, preferably at least 80%, and more preferably at least 95% by weight of the ethylene glycol may be added to the first reactor. However, as mentioned above, all of the ethylene glycol is most preferably added to the first reactor. It will be appreciated that, where less than 100% of the ethylene glycol is added to the first reactor, the remainder is added to the series of depolymerisation reactors downstream of the first depolymerisation reactor.

The catalyst system is used in step (a) to improve the depolymerisation reaction. The catalyst system preferably comprises a transition metal catalyst, such as a zinc-containing catalyst. Suitable zinc catalysts include zinc acetate.

In some embodiments, the catalyst system consists of a transition metal catalyst. However, in preferred embodiments, the catalyst system comprises a catalyst, e.g. as described above, in a carrier. Suitable carriers include nitrogen-containing carriers, such as urea.

Urea has surprisingly been found to be highly effective at maintaining metals (e.g. the transition metal catalyst component of the catalyst system; or traces of metal catalysts that were used to produce the PET originally, such as antimony catalysts) and other contaminants in solution, thereby enabling these components to be separated from BHET in step (b). Thus, the present invention also provides for the use of a urea in catalyst system in a PET recycling process for solubilising metals, in particular a transition metal catalyst component of the catalyst system. The urea may also be used to solubilise contaminants in the PET recycling process. It has surprisingly been found that a eutectic salt catalyst system is particularly effective at solubilising metals and/or contaminants.

The carrier may be used in the catalyst system in an amount of at least 1 times, preferably at least 2 times, and more preferably at least 3 times the molar quantity of transition metal cation in the transition metal catalyst. The carrier may be used in an amount of up to 8 times, preferably up to 6 times, and more preferably up to 5 times the molar quantity of transition metal cation. Thus, the carrier may be used in an amount of from 1 to 8 times, preferably from 2 to 6 times, and more preferably from 3 to 5 times the molar quantity of transition metal cation. These ratios of carrier to transition metal catalyst have been found to give high rates of reaction, whilst retaining metal ions in solution. As mentioned above, the transition metal cation will typically be a zinc cation.

Most preferred for use in step (a) are catalyst systems comprising, and preferably consisting of, zinc acetate and urea, and in particular a catalyst system having the formula [$4NH_2CONH_2.ZnOAc$]. This catalyst system advantageously forms a eutectic salt. Thus, the present invention also provides the use of urea in a catalyst system in a PET recycling process for forming a eutectic salt with a transition metal catalyst component of the catalyst system.

The catalyst system may be in the liquid phase during step (a), and preferably throughout the method of the present invention.

The catalyst system may be used in step (a) in an amount of at least 0.001 times, preferably at least 0.003 times, and more preferably at least 0.004 times the amount of PET by weight. The catalyst system may be used in step (a) in an amount of up to 0.5 times, preferably up to 0.01 times, and more preferably up to 0.005 times the amount of PET by weight. Thus, the catalyst system may be used in step (a) in an amount of from 0.001 to 0.5 times, preferably from 0.003 to 0.01 times, and more preferably from 0.004 to 0.005 times the amount of PET by weight.

At least 60%, preferably at least 80%, and more preferably at least 95% by weight of the catalyst system may be added to the first reactor. However, as mentioned above, all of the catalyst system is preferably added to the first reactor. It will be appreciated that, where less than 100% of the catalyst system is added to the first reactor, the remainder is added to the series of depolymerisation reactors downstream of the first depolymerisation reactor.

Step (a) is generally carried out in the absence of any solvents beyond ethylene glycol and any carriers that may be present in the catalyst system. It will be appreciated that there may be some residual liquid, e.g. water, that has been passed to the claimed process as a coating on the PET due to washing; however, this is not considered to be a solvent for the purposes of the present invention. Thus, solvent may be present in step (a) in an amount of up to 0.1 times, preferably up to 0.01 times, and more preferably up to 0.001 times the amount of PET used in step (a) by weight. Most preferably, substantially no solvent is present in step (a).

Preferably, the depolymerised mixture is separated from any insoluble components between steps (a) and (b). Insoluble components include unreacted PET (though the levels of this will typically be very low, if present at all) and other inert solids. Other solids may include non-PET polymers such as polyethylene (PE) and polypropylene (PP). Preferably, the depolymerised mixture is passed through a filter to remove insoluble components, though other techniques may also be used such as centrifugation. Tricanters may be used in order to achieve very high levels of solid-liquid separation.

In step (b) of the method, a precipitate comprising BHET is crystallised from the depolymerised mixture formed in step (a). Step (b) is preferably carried out using cooling crystallisation. Suitable crystallisers include stirred or wall-scraped crystallisers. The depolymerised mixture may be left to cool naturally, though it is preferably cooled using a coolant. The coolant may be present in a jacket which surrounds the crystalliser, or it may be passed through a series of heat exchangers through which the depolymerised mixture is also passed, e.g. in countercurrent flow.

Step (b) may be carried out by reducing the temperature of the depolymerised mixture to a temperature of at least 5° C., preferably at least 10° C., and more preferably at least 15° C. Step (b) may be carried out by reducing the temperature of the depolymerised mixture to a temperature of up to 50° C., preferably up to 40° C., and more preferably up to 35° C. Thus, step (b) may be carried out by reducing the temperature of the depolymerised mixture to a temperature of from 5 to 50° C., preferably from 10 to 40° C., and more preferably from 15 to 35° C.

At these temperatures, incomplete crystallisation will likely occur. However, since the amount of active cooling that is required to reach these temperatures is relatively low, they are nonetheless preferred. Moreover, in preferred embodiments (discussed below), the liquid remaining after step (b) is recycled to step (a) meaning that there is no loss of BHET (and soluble oligomers thereof) in the process. For similar reasons, just a single crystalliser may be used for carrying out step (b). Where the liquid remaining after step (b) is not recycled, step (b) may in some instances be carried out by reducing the temperature of the depolymerised mixture to a temperature of from 5 to 15° C.

Step (b) may be carried out at atmospheric pressure, i.e. without the application or removal of pressure.

Step (b) may be carried out for a period of at least 10 minutes, preferably at least 20 minutes, and more preferably at least 25 minutes. Step (b) may be carried out for a period of up to 60 minutes, preferably up to 45 minutes, and more preferably up to 35 minutes. Thus, step (b) may be carried out for a period of from 10 to 60 minutes, preferably from 20 to 45 minutes, and more preferably from 25 to 35 minutes.

The depolymerised mixture may be stirred during step (b).

As mentioned above, the liquid that remains at the end of step (b) is preferably recycled for use in step (a). Thus, the method of the present invention preferably comprises isolating the precipitate comprising BHET between steps (b) and (c). The precipitate may be isolated using known methods, e.g. by filtration or centrifugation. The residual liquid is preferably recycled for use in step (a), and more preferably to the first depolymerisation reactor. Typically, the residual liquid will not be further processed as it is recycled to step (a), i.e. the composition of the residual liquid will not be modified, though it will be appreciated that the residual liquid may be passed through pumps and heated. Where the catalyst system comprises a carrier such as urea and a transition metal catalyst, these too will be recycled with the residual liquor.

The conditions used in step (a) may lead to a precipitate containing a high proportion of BHET. BHET may be present in the precipitate in an amount of at least 95%, preferably at least 99%, and more preferably at least 99.5% by weight.

The precipitate formed in step (b) comprises BHET but will typically also comprise dimers and trimers of BHET, e.g. in an amount of at least 0.01% by weight. Dimers and trimers of BHET may be present in the precipitate in an amount of up to 2%, preferably up to 0.5%, and more preferably up to 0.2% by weight. The amount of different components in the precipitate formed in step (b) may be determined using standard techniques, such as high performance liquid chromatography (HPLC). HPLC may be carried out using the following conditions—instrument: Shimazu LC-20A HPLC; detector: photo-diode array (PDA) detector, chromatogram centre wavelength of 223 nm (4 nm 'slit' bandwidth); column: C18, mobile phase: 30% water 70% methanol; flow rate: 0.5 ml/min, oven temp: 35° C., sample: dissolved in methanol; injection volume: 20 uL. Samples are quantified by external standard method.

Preferably, in step (c) of the method, the precipitate formed in step (b) is dissolved in water to form a solution comprising BHET. Dimers and trimers of BHET are insoluble in water and thus, in step (c), the BHET dissolves to form an aqueous phase, while the dimers and trimers remain as solid materials which can be separated from the aqueous phase, e.g. by filtration, at the end of step (c). The aqueous solution can then be recrystallised in step (e), with the purified product used as a high quality monomer feedstock.

Alternatively, in step (c) of the method, the precipitate formed in step (b) may also be dissolved in methanol to form a solution comprising BHET. It has surprisingly been found that methanol is also an excellent solvent for use in step (c), as it provides high levels of decolouration of the precipitate formed in step (b) as well as low levels of product loss. However, the use of water is preferred as dimers and trimers of BHET are partially soluble in methanol and hence these are retained in detectable quantities in the monomer product if methanol is used for the recrystallization in step(c) of the method.

Other alcohol solvents may also be used in step (c) instead of water or methanol. For example, the solvent in step (c) may consist of or comprise any $C_1$-$C_{12}$ alcohol. More specifically, the solvent for use in step (c) may be selected from the group consisting of ethanol, propanols (especially iso-propanol), and butanols (especially n-butanol, tert-butanol). Thus, the solvent for use in step (c) is preferably a protic solvent, and most preferably a polar protic solvent, and may be selected from the group consisting of water, methanol, ethanol, propanols (especially iso-propanol) and butanols (especially n-butanol, tert-butanol). Higher alcohol solvents may also be contemplated.

Furthermore, non-alcoholic solvents may also be contemplated for use in step (c). While the use of a protic solvent, and particularly a polar protic solvent, is particularly preferred in step (c), in embodiments of the present disclosure, the solvent used in step (c) may be instead a polar aprotic solvent, for example dimethyl carbonate (DMC), or an apolar solvent, for example an ether such as dimethoxyethane (DME) or diisopropylether (DIPE).

Most generally, the solvent in step (c) may consist of or comprise any solvent selected from a group comprising water, methanol, ethanol, propanols (especially iso-propanol), butanols (especially n-butanol, tert-butanol), $C_5$ to $C_{12}$ alcohols (especially heptanols, e.g. n-heptanol, octanols, e.g. n-octanol, iso-octanol, nonanols, e.g. n-nonanol, decanols, e.g. n-decanol, dodecanols, e.g. n-dodecanol), esters (especially DMC), or ethers (especially DME or DIPE). Preferably, the solvent in step (c) is or comprises water, methanol, ethanol, iso-propanol or n-butanol. Mixtures of these and/or any of the aforementioned solvents may also be contemplated.

Especially when the solvent used is or comprises water, step (c) may be carried out at a temperature of at least 40° C., preferably at least 60° C., and more preferably at least 70° C. Step (c) may be carried out at a temperature of up to 95° C., preferably up to 92.5° C., and more preferably up to 90° C. Thus, step (c) may be carried out at a temperature of from 40 to 95° C., preferably from 60 to 92.5° C., and more preferably from 70 to 90° C.

Alternatively, especially when the solvent used is or comprises methanol, step (c) may be carried out at a temperature of at least 40° C., preferably at least 50° C., and more preferably at least 55° C. Step (c) may be carried out at a temperature of up to 80° C., preferably up to 70° C. and more preferably up to 65° C. Thus, step (c) may be carried out at a temperature of from 40 to 80° C., preferably from 50 to 70° C., and more preferably from 55 to 65° C.

Step (c) may be carried out at atmospheric pressure, i.e. without the application or removal of pressure.

Step (c) may be carried out for a period of at least 1 minute, preferably at least 5 minutes, and more preferably at least 10 minutes. Step (c) may be carried out for a period of up to 60 minutes, preferably up to 50 minutes, and more preferably up to 40 minutes. Thus, step (c) may be carried out for a period of from 1 to 60 minutes, preferably from 5 to 50 minutes, and more preferably from 10 to 40 minutes.

Dissolution of the precipitate may be carried out with stirring.

Especially when water alone is used as the solvent in step (c), it may be used in an amount of at least 0.1 times, preferably at least 0.15 times, and more preferably at least 0.2 times the amount of PET used in step (a) by weight. Water may be used in step (c) in an amount up to 2.5 times, more preferably up to 1.25 times, and more preferably up to 0.5 times the amount of PET used in step (a) by weight. Thus, water may be used in step (c) in an amount of from 0.1 to 2.5 times, preferably from 0.15 to 1.25 times, and most preferably from 0.2 to 0.5 times the amount of PET used in step (a) by weight.

Especially when methanol alone is used as the solvent in step (c), it may be used in an amount of at least 1 times, preferably at least 1.5 times, and more preferably at least 2 times the amount of PET used in step (a) by weight. Methanol may be used in step (c) in an amount of up to 10 times, preferably up to 5 times, and more preferably up to 3 times the amount of PET used in step (a) by weight. Thus, methanol may be used in step (c) in an amount of from 1 to 10 times, preferably from 1.5 to 5 times, and more preferably from 2 to 3 times the amount of PET used in step (a) by weight.

In step (d) of the method, impurities are removed from the solution produced in step (c) to give a purified solution comprising BHET. Preferably, step (d) comprises decolourising the solution. This may be done by contacting the solution with one or more decolourising agents. Preferably, step (d) is carried out by passing the solution produced in step (c) through a column, and most preferably a plurality of columns in series, packed with one or more decolourising agents. For example, each column in series may be packed with a different decolourising agent. Step (d) may also comprise removing other contaminants such as metals and catalyst residues from the solution produced in step (c).

The one or more decolourising agents used in step (d) may include carbon (e.g. activated carbon, preferably having a high pore volume and surface area), a resin, such as an ion exchange resin, preferably a cation exchange resin, such as an acidic cation exchange resin, preferably comprising sulfonic acid or carboxylic acid groups, with sulfonic acid groups preferred, or alternatively or in addition an anion exchange resin, preferably comprising quaternary ammonium salts, and/or a clay (e.g. activated clays such as bentonite and montmorillonite clays). Preferably, the solution produced in step (c) is contacted with carbon and/or a resin, and preferably with an ion exchange resin. Ion exchange resins are particularly suitable for decolouring and removing metal catalyst residues.

In particularly preferred embodiments of the method, the solution produced in step (c) is contacted with a plurality of different decolourising agents via passage through a plurality of columns arranged in series. For example, a first column may comprise an activated carbon decolourising agent, a second column may comprise a cation exchange resin, and a third column may comprise an anion exchange resin, and the first to third columns may be arranged in series so that the solution produced in step (c) passes through each in step (d).

Step (d) may be carried out at a temperature of at least 40° C., preferably at least 55° C., and more preferably at least 70° C. Step (d) may be carried out at a temperature of up to 110° C., preferably up to 100° C., and more preferably up to 90° C. Thus, step (d) may be carried out at a temperature of from 40 to 110° C., preferably from 55 to 100° C., and more preferably from 70 to 90° C.

Step (d) may be carried out at atmospheric pressure, i.e. without the application or removal of pressure.

Step (d) may be carried out for a period of at least 10 minutes, preferably at least 25 minutes, and more preferably at least 40 minutes. Step (d) may be carried out for a period of up to 120 minutes, preferably up to 100 minutes, and more preferably up to 60 minutes. Thus, step (d) may be carried out for a period of from 10 to 120 minutes, preferably from 25 to 100 minutes, and more preferably from 40 to 80 minutes.

Though less preferred, in some embodiments purification step (d) may be omitted. This is because the purification provided as a result of recrystallisation, for example in methanol, alone may be sufficient for producing a decoloured purified product comprising BHET, though typically such products will be used in low grade applications such as carpets. Thus, in some embodiments, a purified product comprising BHET may be crystallised in step (e) from the solution produced in step (c).

One of the advantages of using methanol in step (c) of the method of the present invention is that the solution may be formed in step (c), purified in step (d) and passed to step (e) for crystallisation without being filtered. This is because methanol dissolves BHET and, unlike water, also dimers and trimers of BHET. While carrying the dimers and trimers through a PET recycling process may be avoided by filtering them out of an aqueous system, step (a) of the present invention produces dimers and trimers in such low amounts that they may be carried through the recycling process with BHET. Thus, in some embodiments, a solid-liquid separation step is not carried out between steps (c) and (e) of the present invention.

However, when water is used in step (c) of the method of the present invention, it is advantageous to filter the BHET solution between steps (c) and (d), to remove BHET dimers and trimers, which are insoluble in water. It may also be preferable to filter the BHET solution between steps (c) and (d) when solvents other than water or methanol are used.

In step (e) of the method, a purified product comprising BHET is crystallised from the purified solution.

Step (e) is preferably carried out using cooling crystallisation. Suitable crystallisers include stirred or wall-scraped crystallisers. The purified solution produced in step (d) may be left to cool naturally, though it is preferably it is cooled using a coolant. The coolant may be present in a jacket which surround the crystalliser, or it may be passed through a series of heat exchangers through which the purified solution is also passed, e.g. in countercurrent flow.

Especially when the solvent used in step (c) is water, step (e) may be carried out by reducing the temperature of the purified solution to a temperature of at least 0° C., preferably at least 10° C., and more preferably at least 20° C. Step (e) may be carried out by reducing the temperature of the purified solution to a temperature of up to 55° C., preferably up to 45° C., and more preferably up to 40° C. Thus, step (e) may be carried out by reducing the temperature of the purified solution to a temperature of from 0 to 55° C., preferably 10 to 45° C., and more preferably 20 to 40° C.

Especially when the solvent used in step (c) is methanol, step (e) may be carried out by reducing the temperature of the purified solution to a temperature of at least 0° C., preferably at least 5° C., and more preferably at least 8° C. Step (e) may be carried out by reducing the temperature of the purified solution to a temperature of up to 30° C., preferably up to 15° C., and more preferably up to 10° C. Thus, step (e) may be carried out by reducing the temperature of the purified solution to a temperature of from 0 to 30° C., preferably from 5 to 15° C., and more preferably from 8 to 12° C.

Step (e) may be carried out at atmospheric pressure, i.e. without the application or removal of pressure.

Step (e) may be carried out for a period of at least 10 minutes, preferably at least 20 minutes, and more preferably at least 25 minutes. Step (e) may be carried out for a period of up to 60 minutes, preferably up to 45 minutes, and more preferably up to 35 minutes. Thus, step (e) may be carried out for a period of from 10 to 60 minutes, preferably from 20 to 45 minutes, and more preferably from 25 to 35 minutes.

The purified solution may be stirred during step (e).

The purified product that is formed in step (e) may contain a high proportion of BHET. BHET may be present in the purified product in an amount of at least 95%, preferably at least 99%, and more preferably at least 99.5% by weight.

If methanol is used as solvent in step (c), the purified product formed in step (e) may also comprise dimers and trimers of BHET, e.g. in an amount of at least 0.01% by weight. Dimers and trimers of BHET may be present in the purified product in an amount of up to 2%, preferably up to 0.5%, and more preferably up to 0.2% by weight. Preferably, amounts of dimers and trimers that are present in the purified product formed in step (e) are substantially the same as the amounts of dimers and trimers that are present in the precipitate formed in step (b). The amount of different components in the purified product formed in step (e) may be determined using the methods described above in connection with the precipitate formed in step (b).

A key advantage of the present invention is that it may be used to produce purified products having low b[h] values, in particular b[h] values of 2 or less. PET prepared from BHET having these colour densities is of a very high grade, and may be used in applications which require excellent visual appearance such as in transparent and colour-free water bottles. Thus, the purified product that is formed in step (e) may exhibit a b[h] value of up to 2, e.g. from 0 to 2. In some instances, the purified product may be used in lower grade applications, e.g. in carpets or films, in which case it may have a b[h] value of up to 4, for instance up to 3.

The method of the present invention may be used to form a purified product in step (e) with a b[h] value that is 0.5 times, preferably 0.1 times, and more preferably 0.05 times that of the PET that is used in step (a). By using preferred embodiments of the present invention, even higher reductions in b[h] value are obtainable, for instance where the PET feed used in step (a) exhibits a high colour density.

Colour density of the purified product that is formed in step (e) may be measured as described above in connection with the PET that is used in step (a).

The purified product comprising BHET is preferably isolated after step (e) and, where step (f) is present, before step (f). The precipitate may be isolated using known methods, e.g. by filtration or centrifugation. Preferably, the protic solvent used in step (c), typically methanol or water, and ethylene glycol are recovered from the residual liquid that remains after isolation of the purified product, for example, using low pressure evaporation and condensation. The protic solvent may be recycled to step (c). The ethylene glycol may be recycled for use in step (a), and more preferably to the first depolymerisation reactor.

One of the principal advantages of using methanol to carry out step (c), rather than water, is that methanol and ethylene glycol may be readily recovered. Thus, the recovery of methanol and ethylene glycol from the residual liquid may be carried out in a single stage evaporator. In contrast, when water is used, recovery of ethylene glycol and water from the residual liquid can be challenging, since water and ethylene glycol form an azeotropic mixture. Thus, where water is used in step (c), the use of a multi-stage evaporator is preferred for recovering water and ethylene glycol from the residual liquid.

When methanol is used in step (c), the recovery of methanol and ethylene glycol from the residual liquid may be carried out by heating the residual liquid to a temperature between the boiling points of methanol and ethylene glycol. For instance, the residual liquid may be heated to a temperature of greater than 65° C., preferably greater than 70° C., and more preferably greater than 75° C. The residual liquid may be heated to a temperature of up to 120° C., preferably up to 100° C., and more preferably up to 90° C. Thus, the residual liquor may be heated to a temperature of from 65 to 120° C., 70 to 100° C., and more preferably from 70 to 90° C.

The recovery of methanol and ethylene glycol from the residual liquid may be carried out at ambient pressure, i.e. without the application or removal of pressure.

Typically, the residual liquid will not be further processed before it is processed to recover methanol and ethylene glycol. Preferably, the methanol is not further processed before being recycled for use in step (c).

When water is used in step(c), a two stage evaporator process is preferred to recover water and ethylene glycol. In a first evaporator, water may be recovered from the residual liquid by application of low pressure, allowing evaporation at reduced temperature; for example, operation of the evaporator at a pressure at or about 10 kPa is preferred, with associated condenser temperature at or about 46° C. and reboiler temperature at or about 132° C. The residual ethylene glycol can then be recovered in a second evaporator by application of low pressure, operating preferably at a pressure at or about 0.08 bar, and a temperature at or about 138° C. The skilled person will appreciate that other operating temperatures and pressures may also be selected for the first and second evaporators. Enhanced recovery of water may be achieved if desired through operating the first evaporator at lower temperature, or by the use of molecular sieves downstream of the first evaporator.

Ethylene glycol may, however, be subject to further purification before it is recycled to step (a). For instance, ethylene glycol may be flashed to separate any organic waste that is entrained therein.

Flashing may take place at a temperature of at least 130° C., preferably at least 150° C., and more preferably at least 170° C. Flashing may take place at a temperature of up to 230° C., preferably up to 210° C., and more preferably up to 190° C. Thus, flashing may take place at a temperature of from 130 to 230° C., preferably from 150 to 210° C., and more preferably from 170 to 190° C.

Flashing typically takes place under reduced pressure. For instance, flashing may take place at a pressure of up to 80,000 Pa, preferably up to 60,000 Pa, and more preferably up to 40,000 Pa. Flashing may take place at a pressure of at least 10,000 Pa, preferably at least 15,000 Pa, and more preferably at least 20,000 Pa. Thus, flashing may take place at a pressure of from 10,000 to 80,000 Pa, preferably from 15,000 to 60,000 Pa, and more preferably from 20,000 to 40,000 Pa.

When methanol is used in step (c), the recovery of methanol is so effective (even at industrial scales such as those described herein) that, when the recovered methanol is recycled to step (c), non-recycled methanol need only be added in step (c) in an amount of up to 0.008 times, preferably up to 0.006 times, and more preferably up to 0.005 times the amount of PET used in step (a) by weight. Non-recycled methanol may be used in step (c) an amount of at least 0.001 times, preferably at least 0.003 times, and more preferably at least 0.004 times the amount of PET used in step (a) by weight. Thus, non-recycled methanol may be used in step (c) in an amount of from 0.001 to 0.008 times, preferably from 0.003 to 0.006 times, and more preferably from 0.004 to 0.005 times the amount of PET used in step (a) by weight. Thus, it will be appreciated that the amount of methanol that is lost during the method of the present invention is extremely low, and much lower than the amount of water that would be lost when used in place of methanol in step (c).

However, when water is used as the solvent in step (c), it may also be effectively recovered so that at least a majority of the water used in step(c) is recycled, preferably using the two stage evaporator process described hereinabove. The water lost is typically removed from the system as humid air. Given the minimal environmental impact of water loss from the system, compared to methanol-containing waste, and the energy cost associated with water recovery, it may not be beneficial to maximize water recycling.

The method of the present invention may further comprise step (f), in which the purified product comprising BHET is dried. The product may be dried by passing air over the purified product, e.g. in a fluidised bed drier.

The air may be heated to a temperature of at least 30° C., preferably at least 40° C., and more preferably at least 50° C. The air may be heated to a temperature of up to 100° C., preferably up to 90° C., and more preferably up to 80° C. Thus, the air may be heated to a temperature of from 30 to 100° C., preferably from 40 to 90° C., and more preferably from 50 to 80° C.

Drying step (f) may be carried out at ambient pressure, i.e. without the application or removal of pressure.

Drying step (f) may be conducted for a period of at least 10 minutes, preferably at least 15 minutes, and more preferably at least 20 minutes. Drying step (f) may be carried out for a period of up to 60 minutes, preferably up to 50 minutes, and more preferably up to 40 minutes. Thus, drying step (f) may be carried out for a period of from 10 to 60 minutes, preferably from 15 to 50 minutes, and more preferably from 20 to 40 minutes.

The method of the present invention may be operated in a batch mode or a continuous mode, though it is preferably operated continuously.

The method of the present invention is preferably carried out on an industrial scale. Thus, the method may recycle at least 10 tonne/day, preferably at least 100 tonne/day, and potentially at least 1,000 tonne/day of PET.

The present invention further provides a purified product comprising BHET which is obtainable, and preferably obtained, using a method as described herein.

The present invention also provides a method for preparing a polymer, said method comprising carrying out a polymerisation reaction using a purified product comprising BHET of the present invention. Preferably, the method comprises preparing the purified product comprising BHET using a method of the present invention. A key advantage of the present invention is that the purified product comprising BHET may be used directly in the polymerisation, i.e. it is not subjected to further purification before use.

The purified product may be used to prepare PET, or it may be used to prepare copolymers which comprise the ethylene terephthalate monomer.

The polymer may be further processed into a bottle, packaging, textiles, or the like. In some embodiments, the polymer may be further processed into a clear bottle, and preferably a colour-free bottle.

The present invention further provides an apparatus for recycling PET, said apparatus comprising:
(a) a series of depolymerisation reactors which are suitable for depolymerising PET to form a depolymerised mixture comprising BHET, wherein the series of depolymerisation reactors is adapted to receive PET, ethylene glycol and a catalyst system;
(b) a crystallisation unit downstream of the polymerisation reactors suitable for crystallising a precipitate comprising BHET from the depolymerised mixture;
(c) a vessel for receiving the precipitate and which is suitable for dissolving the precipitate in a protic solvent to form a solution comprising BHET;
(d) an impurity removal unit for receiving the solution comprising BHET and which removes impurities from the solution to form a purified solution comprising BHET; and
(e) a further crystallisation unit downstream of the purity removal unit suitable for crystallising a purified product comprising BHET from the purified solution.

The following non-limiting Examples illustrate the present invention.

EXAMPLES

Example 1: Depolymerisation Step (a)

Depolymerisation reactions in different series of reactors were simulated. The ratio of PET:ethylene glycol:catalyst system used in the simulation, by mass, was 1:4:0.005. Each reactor was simulated as operating at a temperature of 197° C., and at atmospheric pressure. The simulations were set so as to provide a conversion of 99.0% at the outlet of the final reactor in the series.

The results of the simulation are shown in the following table:

| Number of depolymerisation reactors | Residence time per reactor (hours) | Total Residence time (hours) | Conversion in the outlet (% starting PET) |
| --- | --- | --- | --- |
| 1 | 54 | 54 | (R1) 99.0% |
| 2 | 5 | 10 | (R1) 90.2% |
|   | 5 |    | (R2) 99.0% |
| 3 | 2 | 6  | (R1) 78.6% |
|   | 2 |    | (R2) 95.4% |
|   | 2 |    | (R3) 99.0% |
| 4 | 1.18 | 4.7 | (R1) 68.5% |
|   | 1.18 |     | (R2) 90.0% |
|   | 1.18 |     | (R3) 96.9% |
|   | 1.18 |     | (R4) 99.0% |
| 5 | 0.83 | 4.2 | (R1) 60.4% |
|   | 0.83 |     | (R2) 84.4% |
|   | 0.83 |     | (R3) 93.8% |
|   | 0.83 |     | (R4) 97.6% |
|   | 0.83 |     | (R5) 99.0% |

In order to obtain a production level of around 10,000 tonnes per year, the volume of a single reactor would be about 300 m$^3$. Where a series of three reactors is used, the volume per reactor falls to just over 10 m$^3$. A similar very large decrease in volume per reactor to approximately 11 to 12 m$^3$ can be achieved with a series of only two reactors, as in the most preferred embodiments of the present invention.

A graph showing the efficiency of each depolymerisation reaction, taking into account the data above but also energy and equipment input required in each arrangement, is shown in FIG. 1.

It can be seen that a dramatic improvement in efficiency is observed when a series of at least two depolymerisation reactors is used, as compared to the use of a single depolymerisation reactor.

Example 2: Preferred Solvent for Use in Step (c)

BHET recrystallisation experiments were conducted in a variety of solvents, including methanol, ethanol, isopropanol, butanols and alcohols with a longer carbon chain.

Specifically, 50 g of crude BHET was dissolved in 250 ml of solvent at 80° C. for 1 hour. The BHET was recrystallized by cooling at a rate of 7° C./hour until a temperature of 10° C. was reached. The recrystallised BHET was analysed to determine its colour density. The weight loss during the recrystallisation processes was also measured.

The results are shown in the following table:

| Solvent | Weight loss (%) | Colour density (b[h]) |
| --- | --- | --- |
| Methanol | 28 | 4.06 |
| Ethanol | 57 | 4.05 |

| Solvent | Weight loss (%) | Colour density (b[h]) |
| --- | --- | --- |
| Isopropanol | 60 | 3.87 |
| Tert-butanol | — | 3.91 |
| N-butanol | 56 | 4.03 |
| N-heptanol | 22 | 4.80 |
| Octanol | 26 | 4.88 |
| Isooctanol | 27 | 6.07 |
| N-nonanol | 15 | 6.65 |

It can be seen that each of the lighter solvents gave good levels of decolouration. However, the amount of material lost during the recrystallisation was significantly lower in methanol than in any other of the lighter solvent experiments. Methanol, as well as higher alcohols, is viable for use on an industrial scale.

Example 3: Decolourising Step (d)

A number of different techniques were used for decolourising an aqueous solution of BHET.

Experiments using resins gave promising results:

| Type of resin | Appearance of solution |
| --- | --- |
| Weak-acid cation exchange | High decolouration |
| Macroporous A | Moderate decolouration |
| Macroporous B | Good decolouration |
| Macroporous C | Good-moderate decolouration |
| Strong-acid cation exchange | Very high decolouration |
| Strong-base anion exchange | Moderate decolouration |
| Weak-base anion exchange A | Good-moderate decolouration |
| Weak-base anion exchange B | Good decolouration |

It can be seen that cation exchange resins, and particularly strongly acidic cation exchange resins, gave the most promising results.

Activated carbon was also highly effective at decolourising BHET:

| BHET sample | Colour density (b[h]) |
| --- | --- |
| Untreated | 7.21 |
| Cation exchange resin | 4.58 |
| Activated charcoal | 1.08 |

Figure 2:
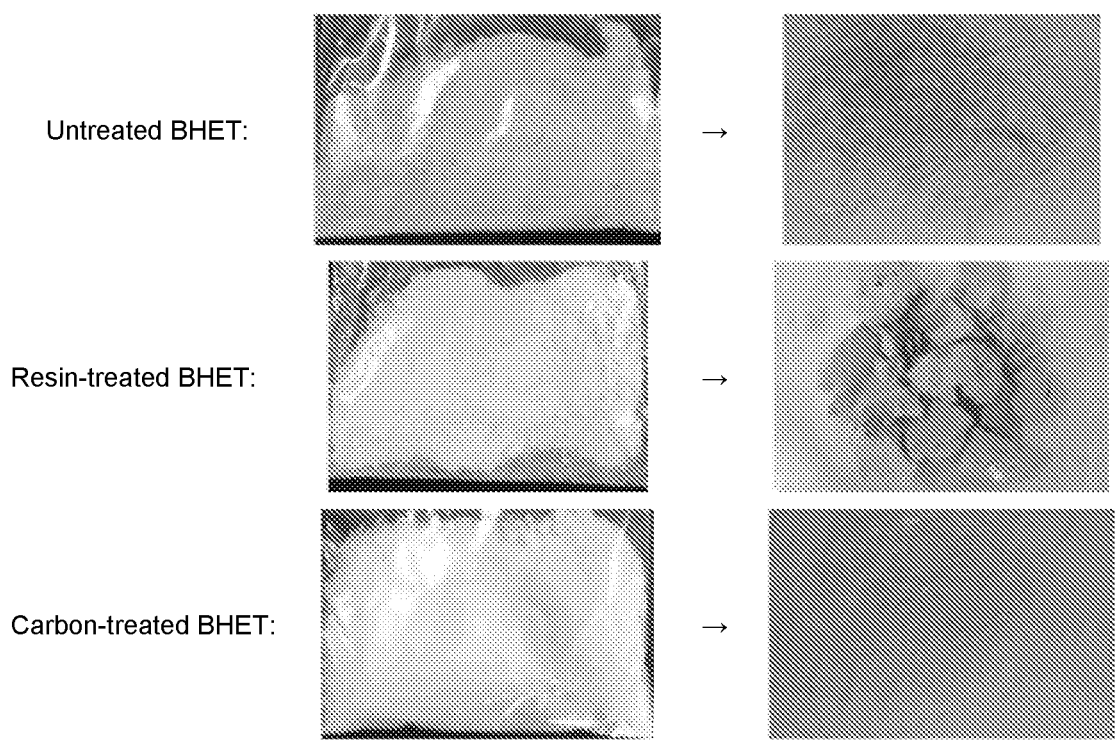
FIG. 2 shows photos of BHET samples which are untreated and treated with various decolourising agents, as well as pictures of PET prepared using the samples.

Pictures of the untreated and treated samples, and pictures of PET prepared using the samples, are shown in FIG. 2. While the cation exchange resin and active carbon both gave good levels of decolouration, the carbon-treated product gave a better quality polymer product.

Further decolourising experiments were carried out. This time, a solution of BHET in methanol was used. The experiments yielded similar results to those carried out on aqueous BHET solutions, but with cation exchange resins giving particularly good results.

Example 4: Recycling Process Using Methanol in Step (c)

Figure 3:
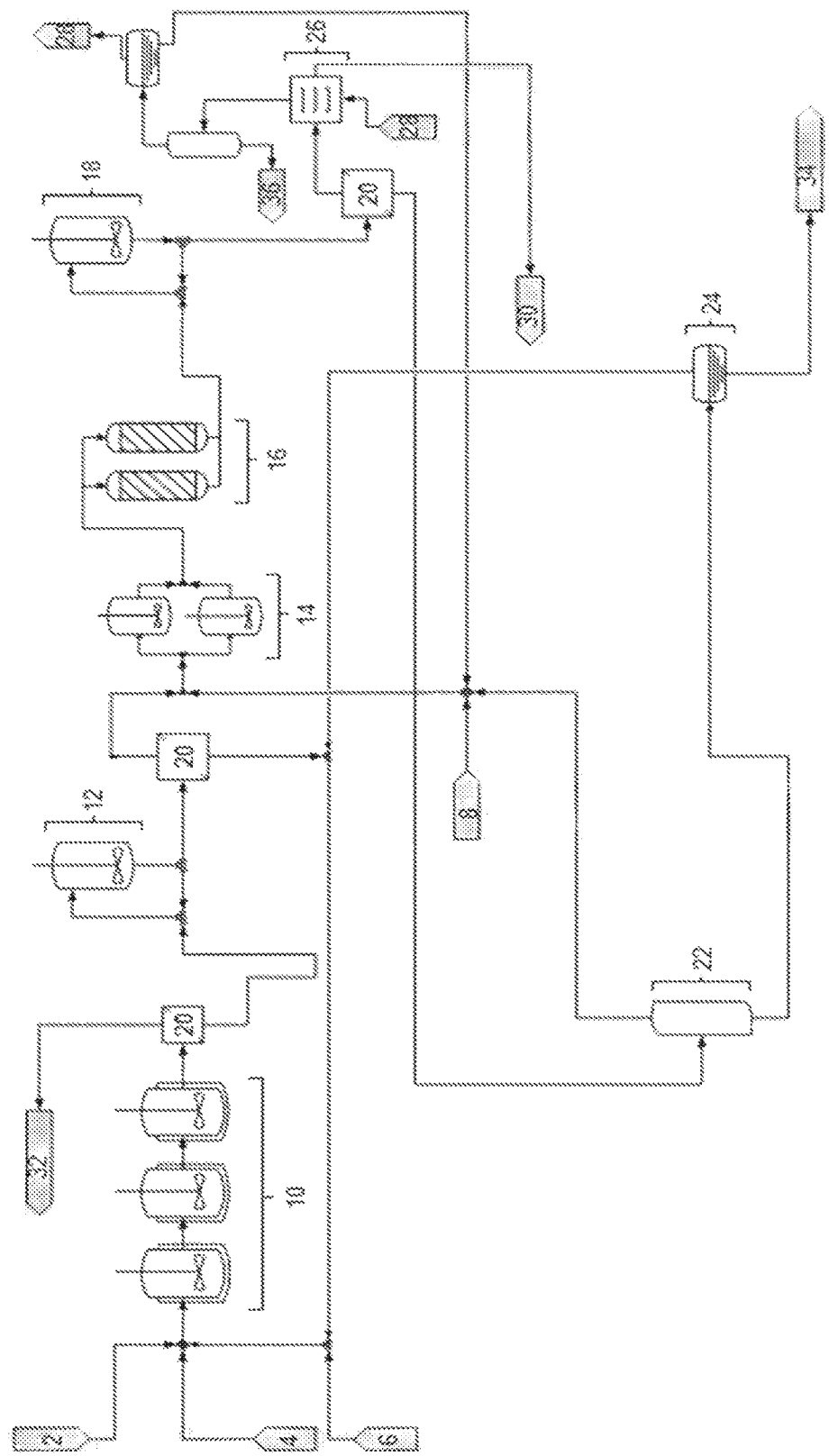
FIG. 3 is a diagram of an apparatus for carrying out the method of the present invention. The apparatus includes a series of three depolymerisation units (10) for depolymerising PET to form BHET; a crystallisation unit (12) downstream of the polymerisation reactors suitable for crystallising a precipitate comprising BHET from the depolymerised mixture; a vessel (14) for receiving the precipitate and which is suitable for dissolving the precipitate in methanol to form a solution comprising BHET; an impurity removal unit (16) for receiving the solution comprising BHET and which removes impurities from the solution to form a purified solution; and a further crystallisation unit (18) downstream of the impurity removal unit suitable for crystallising a purified product comprising BHET from the purified solution.
Figure 4:
FIG. 4 is a photo of representative waste that may be processed using the apparatus shown in FIG. 3.

A process of the present invention was carried out in the apparatus depicted in FIG. 3. Representative waste that was used in the process is shown in FIG. 4. The waste consists of blue and green used PET flakes.

Specifically, PET (2), a zinc acetate and urea catalyst system (4) and ethylene glycol (6) were passed to the first of a series of three depolymerisation reactors (10). A sample taken after the series of three depolymerisation reactors (10) showed 100% conversion of the PET (2) with 99.8% selectivity for BHET.

The depolymerised mixture was passed through a filter (20) to remove insoluble materials (32), then on to a crystalliser (12) in which a precipitate comprising BHET was formed. The precipitate was passed through a filter (20) to one of two stirred vessels (14).

Methanol (8) was added to the vessels (14) to dissolve the precipitate thereby forming a solution comprising BHET.

The solution was passed through a decolourisation stage (16), depicted in the picture as two units in parallel, to another crystalliser (18) where a purified product comprising BHET was formed.

The purified product was passed through another filter (20) to a drying unit (26), and the residual liquor passed to a methanol and ethylene glycol recovery unit (22). The methanol was recycled from recovery unit (22) to stirred vessels (14), while the ethylene glycol was passed through a flash unit (24), where organic waste (34) was removed, before being recycled to the series of depolymerisation reactors (10).

The purified product was dried by passing warm air (28) through drier (26). The warm air (28) was removed from the system via a condenser in which any waste water (36) is removed, and a flash unit from which methanol was recovered and recycled to stirred vessel (14). Once dried, the purified product (30) was removed from the system.

The purified product (30) had a low colour density and was used, without further processing, in the preparation of recycled PET for use in water bottles.

Example 5: Recycling Process Using Water in Step (c)

Figure 5:
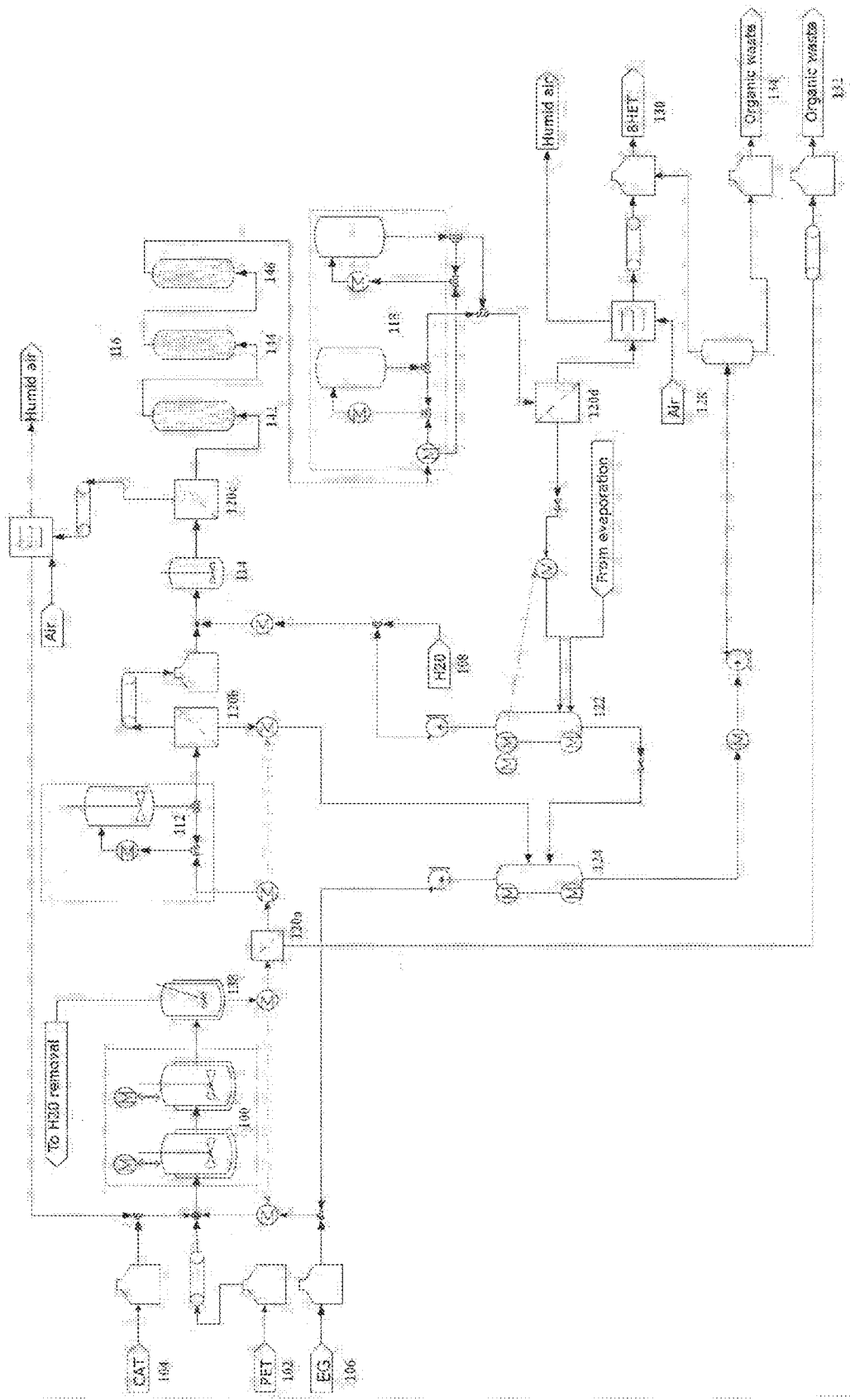
FIG. 5 is a diagram of an apparatus for carrying out the method of the present invention. The apparatus includes a series of two depolymerisation units (100) for depolymerising PET to form BHET; a crystallisation unit (112) downstream of the polymerisation reactors suitable for crystallising a precipitate comprising BHET from the depolymerised mixture; a vessel (114) for receiving the precipitate and which is suitable for dissolving the precipitate in water to form a solution comprising BHET; an impurity removal unit (116) for receiving the solution comprising BHET and which removes impurities from the solution to form a purified solution; and a further crystallisation unit (118) downstream of the impurity removal unit suitable for crystallising a purified product comprising BHET from the purified solution.

A process of the present invention was carried out in the apparatus depicted in FIG. 5.

Specifically, PET (102), a zinc acetate and urea catalyst system (104) and ethylene glycol (106) were passed to the first of a series of two depolymerisation reactors (100). A sample taken after the series of two depolymerisation reactors (100) showed 100% conversion of the PET (102), with selectivity for BHET at 95.0%; the other 5.0% of product consisted substantially of BHET oligomers.

Excess water (140) was removed by an evaporator (138), and the depolymerised mixture was then passed through a filter (120a) to remove insoluble materials (132), then on to a crystalliser (112) in which a precipitate comprising BHET was formed. The precipitate was passed through a filter (120b) to a stirred vessel (114).

Water (108) was added to the vessel (114) to dissolve the precipitate thereby forming a solution comprising BHET.

The solution was passed through a decolourisation stage (116). As depicted, the decolourisation stage comprises a filter (120c), followed by a first unit (142) comprising an activated carbon bed, followed in series by a second unit (144) comprising a cation exchange bed, and followed by a third unit (146) comprising an anion exchange bed. Following the decolourisation stage (116), the solution was passed to another crystalliser (118), in two stages, where a purified product comprising BHET was formed.

The purified product was passed through another filter (120d) to a drying unit (126), and the residual liquor passed to an evaporator (122). The water was recycled from the evaporator (122) to the stirred vessel (114), while the ethylene glycol was passed onwards to a further evaporator (124), where organic waste (134) was removed, before being recycled to the series of depolymerisation reactors (100).

The purified product was dried by passing warm air (128) through drier (126). Once dried, the purified product (130) was removed from the system.

The purified product (130) had a low colour density and was used, without further processing, in the preparation of recycled PET for use in water bottles.

The invention claimed is:

1. A method for recycling polyethylene terephthalate (PET), said method comprising:
    (a) depolymerizing PET in the presence of ethylene glycol and a catalyst system in a series of depolymerization reactors to form a depolymerized mixture comprising bis(2-hydroxyethyl)terephthalate (BHET);
    (b) crystallizing a precipitate comprising BHET from the depolymerized mixture;
    (c) dissolving the precipitate in a protic solvent to form a solution comprising BHET;
    (d) removing impurities from the solution to form a purified solution comprising BHET; and
    (e) crystallizing a purified product comprising BHET from the purified solution.

2. The method of claim 1, wherein the PET is waste PET, wherein the PET is used in the form of particles where:
    at least 80% by weight of the particles pass through a mesh having openings with a diameter of 20 mm;
    100% by weight of the particles pass through a mesh having openings with a diameter of 25 mm; and/or
    up to 1% by weight of the particles pass through a mesh having openings with a diameter of 0.1 mm.

3. The method of claim 1, wherein the PET has a b[h] value of greater than 5.

4. The method of claim 1, wherein each of the depolymerization reactors used in step (a) is operated:
    at a temperature of from 150 to 230° C.;
    at atmospheric pressure;
    for a period of from 20 minutes to 4 hours; and/or
    with stirring.

5. The method of claim 1, wherein ethylene glycol is used in step (a) in amount of from 2 to 6 times the amount of PET by weight.

6. The method of claim 1, wherein the catalyst system comprises a transition metal catalyst.

7. The method of claim 1, wherein the catalyst system comprises a carrier.

8. The method of claim 1, wherein the catalyst system is used in step (a) in an amount of from 0.001 to 0.5 times the amount of PET by weight.

9. The method of claim 1, wherein step (b) is carried out using cooling crystallization:
    by reducing the temperature of the depolymerized mixture to a temperature of from 5 to 50 at atmospheric pressure;
    for a period of from 10 to 60 minutes; and/or
    under stirring.

10. The method of claim 1, wherein the protic solvent comprises one or more of water, methanol, ethanol, isopropanol, and n-butanol.

11. The method of claim 10, wherein step (c) is carried out:
    at a temperature of from 40 to 95° C.;
    at atmospheric pressure;
    for a period of from 1 to 60 minutes; and/or
    under stirring.

12. The method of claim 10, wherein water is used in step (c) in an amount of from 0.1 to 2.5 times the amount of PET used in step (a) by weight.

13. The method of claim 1, wherein step (d) comprises decolorizing the solution by contacting the solution with carbon, an ion exchange resin, and/or a clay.

14. The method of claim 1, wherein step (e) is carried out using cooling crystallization:
    by reducing the temperature of the purified solution to a temperature of from 0 to 55° C.;
    at atmospheric pressure;
    for a period of from 10 to 60 minutes; and/or
    under stirring.

15. The method of claim 1, wherein the depolymerized mixture is passed through a filter between steps (a) and (b) to remove insoluble components.

16. The method of claim 1, wherein the precipitate comprising BHET is isolated between steps (b) and (c), and wherein the filtrate is recycled to the first depolymerization reactor in step (a).

17. The method of claim 1, wherein the protic solvent is methanol, and the method comprises isolating the purified product comprising BHET after step (e), wherein the method comprises processing the filtrate to recover methanol and ethylene glycol, and recycling methanol to step (c) and/or ethylene glycol to a depolymerization reactor in step (a).

18. The method of claim 1, wherein the method further comprises:
    (f) drying the purified product comprising BHET.

19. The method of claim 1, wherein the purified product comprising BHET has a b/[h] value of up to 2; and/or
    wherein the purified product comprises:
    BHET in an amount of at least 95%; and
    dimers and trimers of BHET in an amount of at least 0.01% by weight.

20. An apparatus for recycling polyethylene terephthalate (PET), said apparatus comprising:
    (a) a series of depolymerization reactors which are adapted for depolymerizing PET to form a depolymerized mixture comprising bis(2-hydroxyethyl) terephthalate (BHET), wherein the series of depolymerization reactors is adapted to receive PET, ethylene glycol and a catalyst system;
    (b) a crystallization unit downstream of the polymerization reactors adapted for crystallizing a precipitate comprising BHET from the depolymerized mixture;
    (c) a vessel for receiving the precipitate and which is adapted for dissolving the precipitate in a protic solvent to form a solution comprising BHET;
    (d) an impurity removal unit for receiving the solution comprising BHET and which removes impurities from the solution to form a purified solution; and
    (e) a further crystallization unit downstream of the purity removal unit suitable for crystallizing a purified product comprising BHET from the purified solution.

* * * * *